United States Patent
Capehart

[19]

[11] Patent Number: 6,035,565
[45] Date of Patent: Mar. 14, 2000

[54] CALENDAR DISPLAY

[76] Inventor: Richard M. Capehart, 7719 Wood Mill Dr., Richmond, Va. 23231

[21] Appl. No.: 08/951,098

[22] Filed: Oct. 15, 1997

Related U.S. Application Data

[63] Continuation-in-part of application No. 08/605,844, Feb. 26, 1996, Pat. No. 5,784,814.

[51] Int. Cl.⁷ ...................................................... G09D 3/04
[52] U.S. Cl. ............................... 40/121; 40/107; 40/120; 40/594; 40/600; 283/2
[58] Field of Search ............................. 40/107, 120, 121, 40/124.16, 539, 594, 600, 610; 283/2; D19/21

[56] References Cited

U.S. PATENT DOCUMENTS

| | | |
|---|---|---|
| Re. 22,839 | 2/1947 | Potter . |
| D. 26,537 | 1/1897 | Pitz ......................................... 40/107 X |
| 1,491,668 | 4/1924 | Brown . |
| 1,559,247 | 10/1925 | Graton .................................. 40/107 X |
| 1,594,499 | 8/1926 | Deaton . |
| 2,128,989 | 9/1938 | Dickerson . |
| 2,321,607 | 6/1943 | Lichter . |
| 2,356,132 | 8/1944 | Trollen . |
| 2,690,625 | 10/1954 | Dazey . |
| 2,755,576 | 7/1956 | Golden . |
| 3,203,552 | 8/1965 | Stolarz .................................. 40/120 X |
| 3,305,205 | 2/1967 | Frankl .................................. 40/120 X |
| 3,305,206 | 2/1967 | Nichols ................................. 40/120 X |
| 3,322,093 | 5/1967 | Goland et al. . |
| 3,482,346 | 12/1969 | Woofter ................................... 40/120 |
| 3,605,306 | 9/1971 | Diambra et al. ......................... 40/107 |
| 4,276,703 | 7/1981 | Brindley . |
| 4,423,562 | 1/1984 | Nichols . |
| 4,720,123 | 1/1988 | Chelius ............................... 40/107 X |
| 4,757,624 | 7/1988 | Holec ....................................... 40/119 |
| 4,948,034 | 8/1990 | Rohloff . |
| 5,016,917 | 5/1991 | Dubner et al. ........................ 40/107 X |
| 5,056,250 | 10/1991 | Weissleder et al. ..................... 40/539 |
| 5,062,229 | 11/1991 | Werjefelt . |
| 5,090,733 | 2/1992 | Bussiere .............................. 40/107 X |
| 5,280,961 | 1/1994 | Rohloff ..................................... 283/2 |
| 5,661,918 | 9/1997 | Malcolm et al. ........................ 40/107 |
| 5,784,814 | 7/1998 | Capehart .............................. 40/107 X |
| 5,893,586 | 4/1999 | McGuire ................................... 283/2 |

FOREIGN PATENT DOCUMENTS 438380  12/1926  Germany .

*Primary Examiner*—Brian K. Green
*Assistant Examiner*—Andrea Chop
*Attorney, Agent, or Firm*—Donald A. Kettlestrings

[57] ABSTRACT

A calendar display includes a flat support defining a plurality of lines of structural weakness. A plurality of stacked sheets bearing weekly and monthly time indicia are removably connected to a front surface of the support adjacent to a first, upper edge of the support. An adhesive strip is located adjacent to a second, lower edge on a back surface of the support, and a magnet is connected to a back surface of the support adjacent to a first, upper edge thereof. Manipulation of the support by bending the support in predetermined directions about the lines of structural weakness and contacting the adhesive strip with the back surface of the support permits the support to be configured as a self-supporting stand for displaying the sheets on a horizontal surface. The support also can be severed along a predetermined one of the lines of structural weakness to provide a display of the sheets which can be attached to a vertical surface by means of the magnet connected to the back surface of the support adjacent to the first, upper edge of the support.

23 Claims, 4 Drawing Sheets

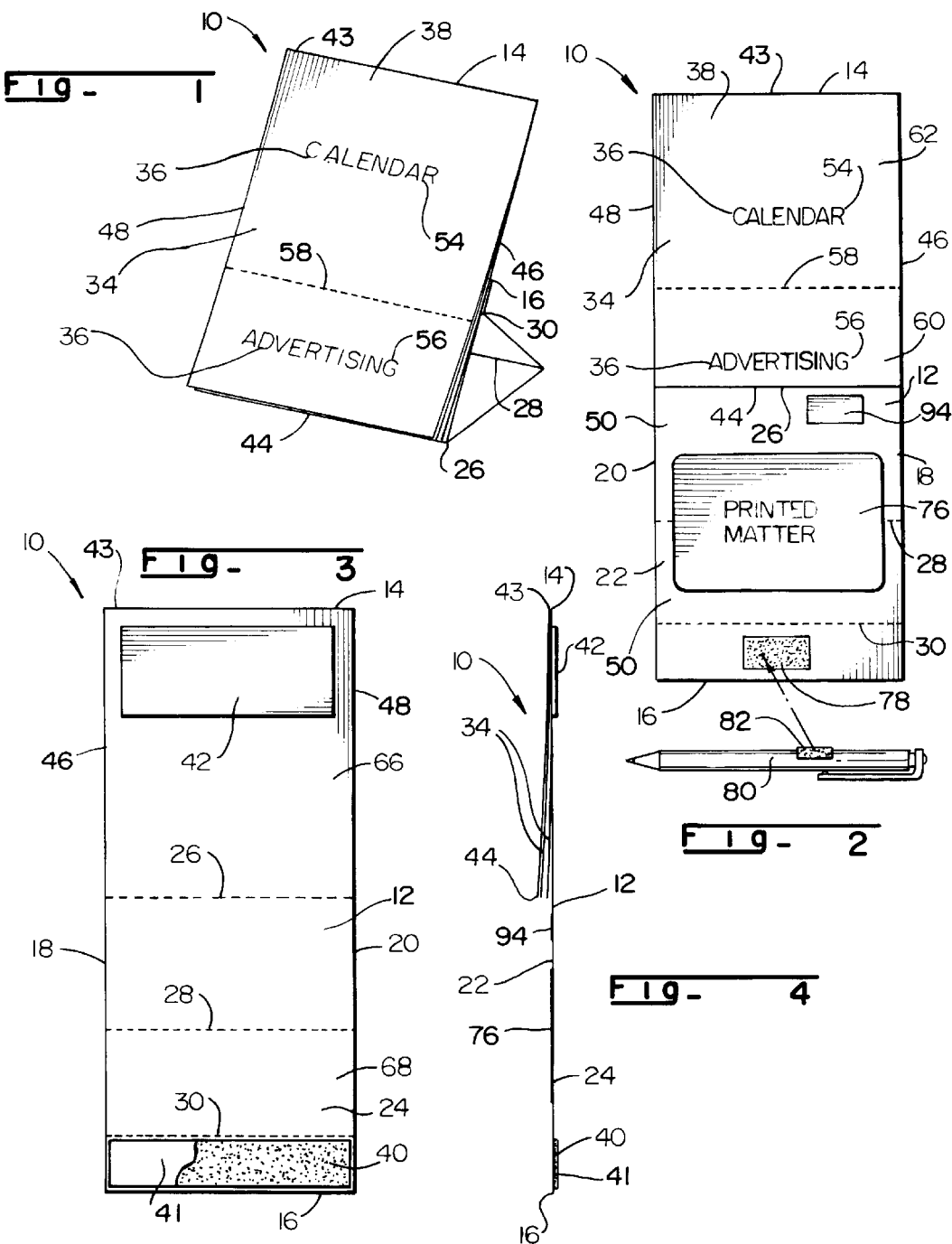

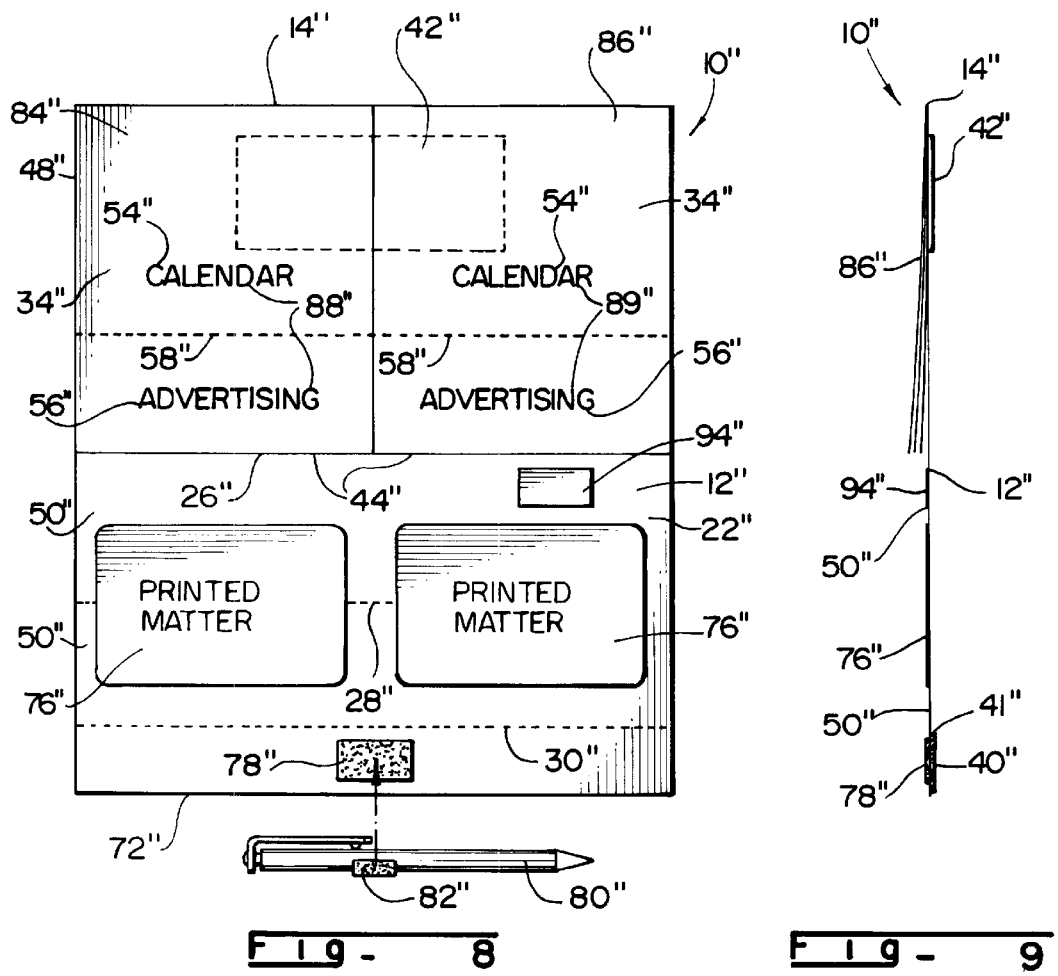

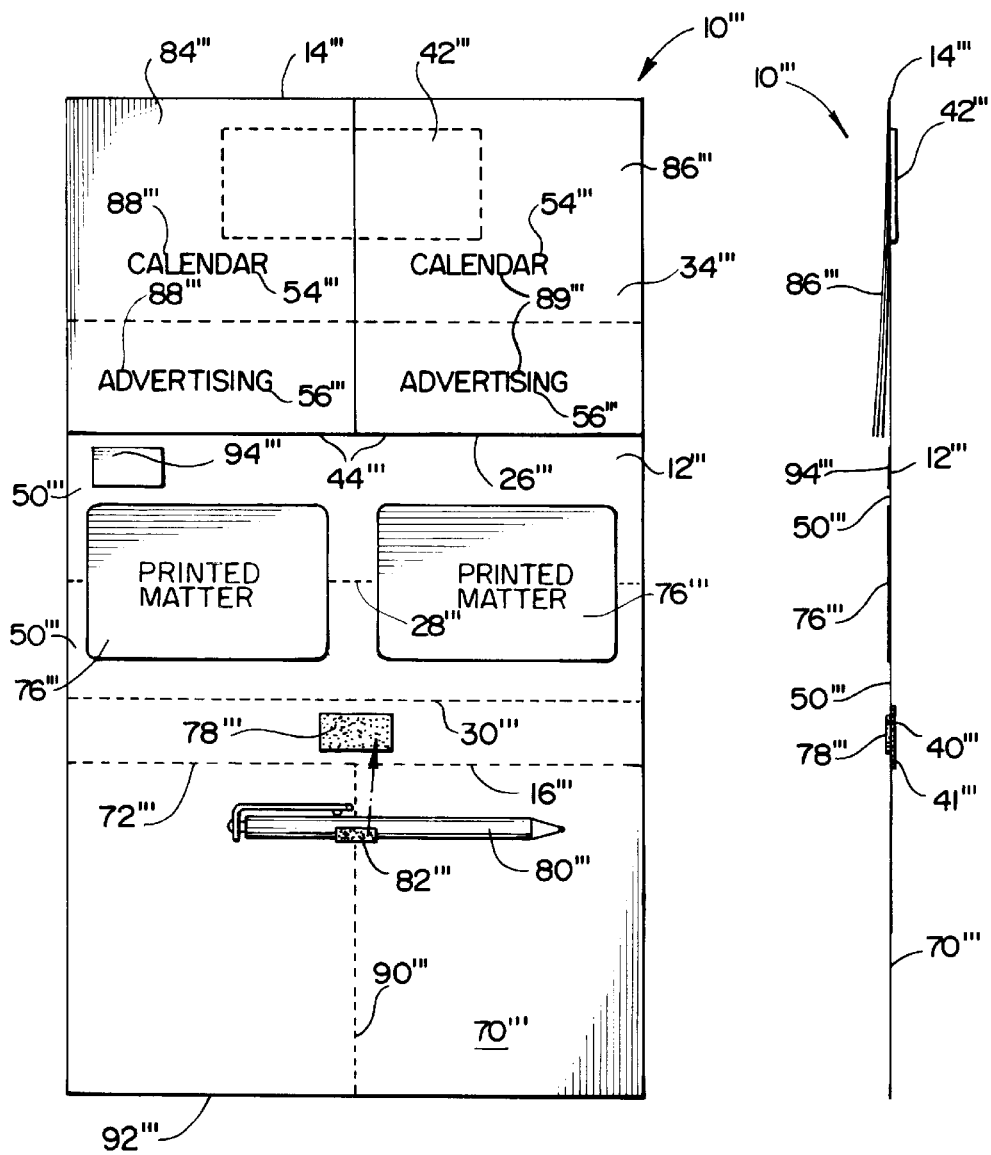

CALENDAR DISPLAY

CROSS REFERENCE TO RELATED APPLICATION

This application is a continuation-in-part of U.S. application Ser. No. 08/605,844 filed Feb. 26, 1996, for Calendar Display now U.S. Pat. No. 5,784,814.

BACKGROUND OF THE INVENTION

This invention relates to displays and more particularly to calendar displays which can be manipulated from a flat configuration to form a support stand for supporting a calendar on a horizontal surface. The displays can also be manipulated to enable a portion of the calendar displays to be attached to a vertical surface.

Calendars provide effective advertising devices and calendars are frequently mailed or otherwise shipped to customers. Storing, mailing or shipping typically requires that the calendar be in an essentially flat configuration to save space, but it is also desirable to provide a calendar which includes its own built-in stand for positioning on a horizontal surface.

It is, therefore, an object of the present invention to provide a calendar display.

Another object is to provide a calendar display which can be stored, mailed or shipped in a substantially flat configuration.

A further object of the invention is the provision of a calendar display which can be quickly and easily manipulated from a substantially flat configuration to form a stand for positioning and supporting the calendar on a horizontal surface.

Yet another object of the present invention is the provision of such a calendar display which can be quickly and easily modified to create a calendar display which can be mounted or attached to a vertical surface.

Another object of the present invention is the provision of such a calendar which has a removable card or cards attached to the calendar for various purposes.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a display comprising: a support defining first and second opposed edges and third and fourth opposed edges, and further defining opposed front and back surfaces; the support defining a first line of structural weakness for aiding bending or severance located substantially midway between the first and second opposed edges; the support defining a second line of structural weakness for aiding bending located between the first line and the second edge; the support defining a third line of structural weakness for aiding bending located between the second line and the second edge; a plurality of stacked sheets bearing indicia and defining upper margins removably connected at the margins to each other and to the first surface of the support adjacent to the first edge; and an adhesive strip located adjacent to the second edge on the back surface of the support and between the second edge and the third line. A magnet is connected to the back surface of the support adjacent to the first edge.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate preferred embodiments of the invention and, together with the description, serve to explain the principles of the invention.

FIG. 1 is a perspective view of the display configured to be positioned on a horizontal surface;

FIG. 2 is a front view showing the display in an unfolded configuration;

FIG. 3 is a rear view showing the display in an unfolded configuration;

FIG. 4 is a side view showing the display in an unfolded configuration;

FIG. 8 is a front view showing another display embodiment in an unfolded configuration;

FIG. 9 is a side view of the display shown in FIG. 8;

FIG. 10 is a front view showing another display embodiment in an unfolded configuration; and FIG. 11 is a side view of the display shown in FIG. 10.

DESCRIPTION OF THE PREFERRED EMBODIMENTS

Figures 5, 6, 7:
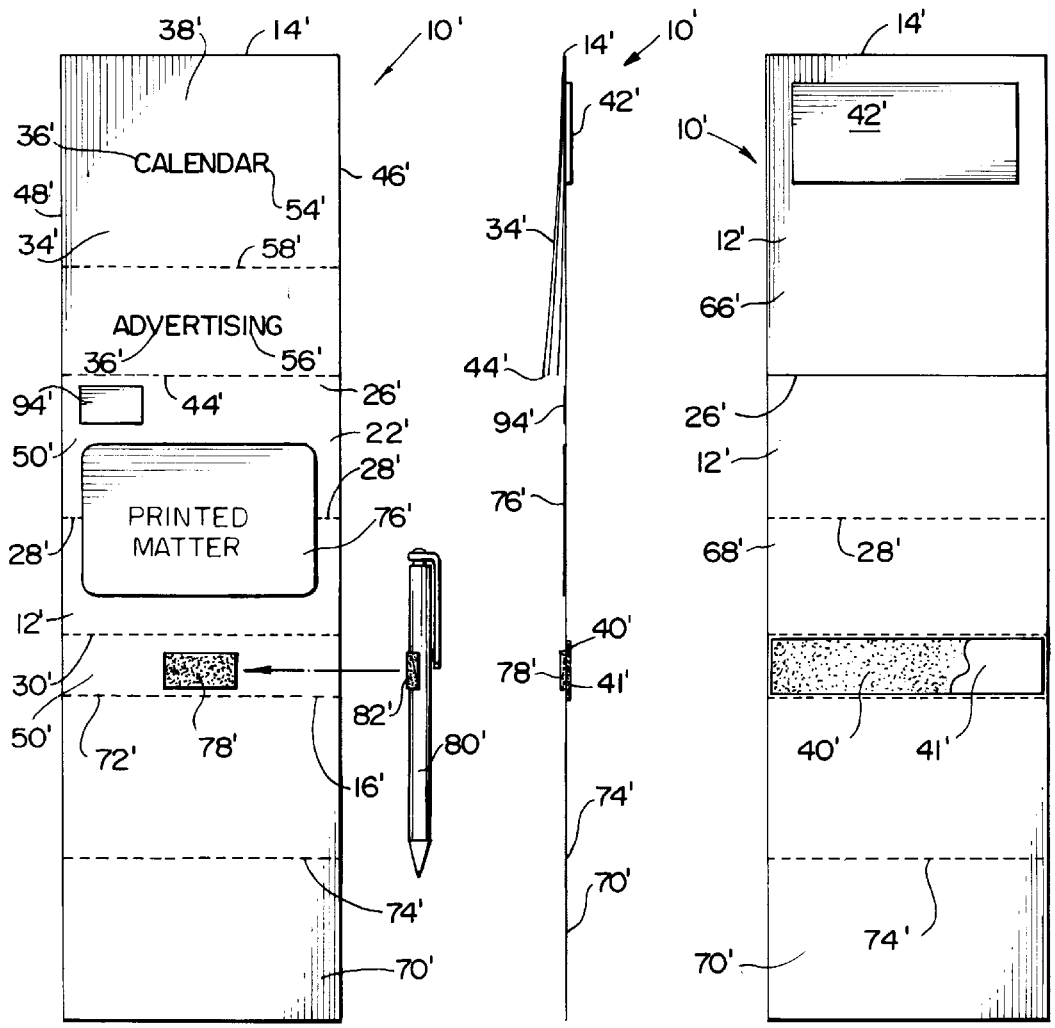
FIG. 5 is a front view showing another display embodiment in an unfolded configuration.
FIG. 6 is a rear view showing the display of FIG. 5.
FIG. 7 is a side view of the display shown in FIG. 5.

With reference now to the drawings, wherein like reference characters designate like or corresponding parts throughout the several views, there is shown a display 10 in FIGS. 1–4 which comprises a support 12 defining first and second opposed edges 14, 16 and third and fourth opposed edges 18, 20. Support 12 further defines opposed front and back surfaces 22, 24, respectively.

Support 12 defines a first line 26 of structural weakness for aiding bending or severance located preferably midway between edges 14, 16. Support 12 further defines a second line 28 of structural weakness for aiding bending located between first line 26 and second edge 16. In accordance with the invention, support 12 further defines a third line 30 of structural weakness for aiding bending located between second line 28 and second edge 16.

A plurality of stacked sheets 34 bearing indicia 36 and defining upper margins 38 are removably connected at margins 38 to each other and to front surface 22 of support 12 adjacent to first edge 14. An adhesive strip 40 is located immediately adjacent to second edge 16 on back surface 24 of support 12 and between second edge 16 and third line 30 of structural weakness. A magnet 42 is preferably connected in a conventional manner, such as by adhesive, to back surface 24 of support 12 adjacent to first edge 14.

Each of sheets 34 defines first and second opposed edges 43, 44 and third and fourth opposed edges 46, 48 which are preferably positioned in alignment with first edge 14 of support 12, first line 26 of structural weakness, and third and fourth edges 18, 20 of support 12, respectively.

Each of sheets 34 preferably bears first and second indicia 54, 56 and defines a fourth line 58 of structural weakness for severance which extends completely across each sheet 34 between indicia 54 and 56 for enabling removal of that portion 60 of sheet 34 which contains second indicia 56 from that portion 62 of sheet 34 which contains first indicia 54.

Adhesive strip 40 preferably includes a double-sided adhesive strip and a cover strip 41 removably attached to the double-sided adhesive strip for protecting the double-sided adhesive strip when not in use.

In accordance with a preferred embodiment of the invention, first indicia 54 preferably include weekly and monthly time indicia, and second indicia 56 preferably include advertising information.

Fourth line 58 of structural weakness for severance and indicia 56 are located beneath time indicia 54 as indicia 54, 56 are normally viewed during use of display 10. Support 12 and each of sheets 34 are preferably rectangular in shape, and sheets 34 can be conventionally removably connected to each other and to support 12 at margins 38 by adhesive, stitching, staples, a spiral binding or the like. Support 12 is preferably made from cardboard or a heavy weight paper, and sheets 34 are preferably comprised of paper.

Although the locations of lines 26, 28 and 30 on support 12 may be varied, it is preferred that second line 28 of structural weakness be located a distance from first line 26 equal to forty-four to forty-five percent of the distance between first line 26 of structural weakness and second edge 16 of support 12. Similarly, it is preferred that third line 30 of structural weakness be located a distance from first line 26 equal to eighty-three to eighty-four percent of the distance between first line 26 of structural weakness and second edge 16 of support 12. The relative locations of lines 26, 28 and 30 are important to create the preferred stability and appearance of display 10 when the display is folded and configured to be positioned on a horizontal surface, as shown in FIG. 1. First, second and third lines of structural weakness 26–30 are preferably scored or perforated lines.

In use, display 10 can be manipulated and folded to reduce its overall length for convenience in storing, shipping or mailing. This can typically be accomplished by folding back support 12 about line 26 or about line 28. Display 10 is essentially flat after these manipulations.

Manipulation of display 10 to form a stand from support 12 for displaying stacked sheets 34 on a horizontal surface begins with the step of unfolding support 12 from its previously described folded condition for storing, shipping or mailing. Support 12 is then folded backwardly about scored line 26. Support 12 is then or simultaneously folded backwardly about line 28.

Cover strip 41 is then removed from adhesive strip 40 to expose an adhesive surface of strip 40, and support 12 is then folded forwardly about line 30. Simultaneously therewith, adhesive strip 40 is moved into contact with back surface 24 of support 12 at a location substantially midway between first edge 14 and first line 26 of structural weakness. Edge 16 and adhesive strip 40 are then pressed against and adhered to back surface 24 to result in the display shown in FIG. 1, which is self-supporting for display of the calendar on a horizontal surface. The dimensions of support 12 and the relative positions of lines 26–30 on support 12 provide for a desirable rearward canting or sloping of sheets 34 when display 10 is positioned on a horizontal surface, as shown in FIG. 1.

If it is desired to position display 10 on a vertical surface, support 12 can be torn or cut along line 26 of structural weakness to separate that portion 66 of support 12 between line 26 and first edge 14 from the remaining portion 68 of support 12 between line 26 and edge 16. Sheets 34 are aligned with the edges of portion 66 of support 12 so that a neat appearance is created. Separated portion 66 of support 12, together with sheets 34, can then be quickly and easily attached to a vertical surface by use of magnet 42.

Fourth line of structural weakness 58 on each sheet 34 enables advertising portion 60 to be removed from the calendar for any desired purpose.

Front surface 22 of support 12 in display 10 is preferably conventionally covered or laminated by a thin film of conventional smooth, remarkable, plastic material 50 for enabling removable marking on the thin film material with ink. As conventionally used, ink can be quickly and easily wiped from material 50 on front surface 22 with a rag, paper or even with a hand.

A card 76 is preferably removably attached to front surface 22 of support 12 in display 10 between first line 26 of structural weakness and second edge 16. Card 76 contains printed matter and can be used for a variety of purposes, such as a credit card, etc. Card 76 is removably glued to remarkable surface 50 with a conventional glue or gum which enables easy removal of card 76 without leaving glue or gum residue on remarkable surface 50. Card 76 is removed before display 10 is manipulated to be positioned on a horizontal surface.

Display 10 also preferably includes a first fastening element 78, such as a hook and loop or Velcro® fastener, attached to front surface 22 adjacent to second edge 16. A pen 80 may be provided which contains ink and which has a second fastening element 82, such as a hook and loop or Velcro® fastener, attached to pen 80 for removably connecting pen 80 to fastening element 78.

An alternative embodiment display 10' is shown in FIGS. 5–7. The configuration and structure of display 10' are generally identical to display 10, (FIGS. 1–4). Display 10' includes support 12' made from cardboard or heavy weight paper. Single prime numerals in FIGS. 5–7 corresponding to the numerals in FIGS. 1–4 designate corresponding structural features of display 10' with respect to display 10. Display 10' further includes a first card 70' removably attached to edge 16' of support 12'. Card 70' preferably contains printed matter thereon, and card 70' may be a reply card for mailing or it may contain other printed information, such as sporting schedules, advertising, etc.

In display 10', edge 16' defines a fifth line 72' of structural weakness for aiding bending or severance. Card 70' also preferably defines a sixth line 74' of structural weakness for aiding bending so that card 70' can be folded, if desired, about sixth line 74' after card 70' has been removed from support 12' by tearing along fifth line 72' of structural weakness. After removal of card 70', display 10' is manipulated for use in the same manner as described with respect to display 10.

Card 70' is preferably rectangular, and sixth line 74' of structural weakness is preferably parallel with fifth line 72' of structural weakness. Sixth line 74' is preferably located at a midpoint of card 70' so card 70' can be folded in half after it has been removed from support 12'.

Card 76' is preferably removably attached to remarkable surface 50' of display 10' in the same manner as previously described with respect to card 76 attached to display 10. Card 76' is located between first line of structural weakness 26' and fifth line of structural weakness 72'. Card 76' contains printed matter similar to that contained by card 76, and card 76' is removed before display 10' is manipulated to be positioned on a horizontal surface in the manner illustrated for display 10 in FIG. 1.

Display 10' also preferably includes first fastening element 78' attached to front surface 22' adjacent to fifth line 72' of structural weakness. A pen 80' may be provided which contains ink, and a second fastening element 82' is attached to pen 80' for removably connecting pen 80' to first fastening element 78'.

Another display embodiment 10" is shown in FIGS. 8 and 9 wherein a plurality of stacked sheets 34" include a first plurality 84" of the stacked sheets and a second plurality 86" of the stacked sheets positioned adjacent to the first plurality 84" of stacked sheets so that indicia 88", 89" on the pluralities of sheets 84", 86", respectively, can be simultaneously viewed and displayed in side-by-side relationship. Two yearly calendars can thus be simultaneously displayed.

Display 10" includes support 12" made from cardboard or heavy weight paper, and support 12" is identical in configuration to support 12 (FIGS. 1–4) with the exception that support 12" is twice the size in its width along edge 14" as support 12. Double prime numerals in FIGS. 8 and 9 corresponding to the numerals in FIGS. 1–4 designate corresponding structural features of display 10" with respect to display 10, and display 10" is manipulated for use in the same manner as described with respect to display 10. In addition, one or more cards 76" may be removably glued to front surface 22" of display 10" with a conventional glue or gum which enables easy removal of card 76" without leaving glue or gum residue on re-markable surface 50". Cards 76" are removed before display 10" is manipulated to be positioned on a horizontal surface in the manner illustrated for display 10 in FIG. 1.

Still another display embodiment 10''' of the invention is shown in FIGS. 10 and 11. Triple prime numerals in FIGS. 10 and 11 corresponding to the numerals in FIGS. 1–4 designate corresponding structural features of display 10''' with respect to display 10. Display 10''' includes support 12''' made from cardboard or heavy weight paper. The width of display 10''' along edge 14''' is the same as the width of display 10" along edge 14". A card 70''' is removably attached to support 12''' along line 72''' of structural weakness for aiding bending or severance. Card 70''' preferably defines a seventh line 90''' of structural weakness for aiding bending or severance which extends perpendicularly between edge 92''' and fifth line 72''' of structural weakness.

Display 10''', illustrated in FIGS. 10 and 11, is manipulated and used in the same manner as previously described with respect to display 10', shown in FIGS. 5–7. Prior to use of display 10''', card 70''' is removed from support 12''' by tearing along line 72''' of structural weakness. Also, cards 76''' are removed before display 10''' is manipulated to be positioned on a horizontal surface in the manner illustrated for display 10 in FIG. 1.

In each of the invention embodiments 10, 10', 10", and 10''', a lottery ticket or tickets 94–94''', respectively, can be removably attached to supports 12–12''', respectively. The lottery tickets can be conventionally configured and manufactured for permitting scratching off of a removable covering to reveal the numbers on the lottery ticket. The lottery tickets can be removably attached by use of the same type of conventional glue or gum used to removably attach cards 76–76''' to supports 12–12''', respectively.

Cards 70',70''' may be scored or perforated to create lines of structural weakness as described above, or lines of structural weakness for aiding bending or severance can be positioned at other locations within cards 70',70''' to permit the cards to be folded or severed into different configurations after removal from supports 12', 12''', respectively.

Front surfaces 22', 22", 22''' of supports 12', 12" and 12''', respectively, are each preferably covered or laminated by a thin film of conventional smooth, remarkable, plastic material 50', 50" and 50''', respectively, for enabling removable marking on the thin film material with ink, as described above with respect to material 50 on support 12.

This invention provides for calendar displays which can be stored or shipped in a flat condition and which can be quickly and easily manipulated for displaying the calendars on a horizontal or vertical surface.

The invention in its broader aspects is not limited to the specific details shown and described, and departures may be made from such details without departing from the principles of the invention and without sacrificing its chief advantages.

What is claimed is:

1. A display comprising:
    a support defining first and second opposed edges and third and fourth opposed edges, and further defining opposed front and back surfaces;
    said support defining a first line of structural weakness for aiding bending or severance located substantially midway between said first and second opposed edges;
    said support defining a second line of structural weakness for aiding bending located between said first line and said second edge;
    said support defining a third line of structural weakness for aiding bending located between said second line and said second edge;
    a plurality of stacked sheets bearing indicia and defining upper margins removably connected at said margins to each other and to said front surface of said support adjacent to said first edge;
    an adhesive strip located adjacent to said second edge on said back surface and between said second edge and said third line; and
    a magnet connected to said back surface of said support adjacent to said first edge.

2. A display as in claim 1 wherein each of said sheets defines first and second opposed edges and third and fourth opposed edges which are positioned in substantial alignment with said first edge of said support, said first line of structural weakness, and said third and fourth edges of said support, respectively.

3. A display as in claim 2 wherein each of said sheets bears first and second indicia and defines a fourth line of structural weakness for severance which extends completely across each said sheet between said first and second indicia for enabling removal of a portion of said sheet which contains said second indicia from a portion of said sheet which contains said first indicia.

4. A display as in claim 3 wherein said adhesive strip includes a double-sided adhesive strip and a cover strip removably attached to said double-sided adhesive strip for protecting said double-sided adhesive strip when not in use.

5. A display as in claim 4 wherein said first indicia include weekly and monthly time indicia.

6. A display as in claim 5 wherein said second indicia include advertising information.

7. A display as in claim 6 wherein said fourth line of structural weakness for severance and said advertising information are located beneath said time indicia as said time indicia and said advertising information are viewed during use of said display.

8. A display as in claim 7 wherein said support and each of said sheets are rectangular in shape.

9. A display as in claim 8 wherein said sheets are removably connected to each other and to said support by adhesive.

10. A display comprising:

a support defining first and second opposed edges and third and fourth opposed edges, and further defining opposed front and back surfaces;

said support defining a first line of structural weakness for aiding bending or severance located substantially midway between said first and second opposed edges;

said support defining a second line of structural weakness for aiding bending located between said first line and said second edge;

said support defining a third line of structural weakness for aiding bending located between said second line and said second edge;

a plurality of stacked sheets bearing indicia and defining upper margins removably connected at said margins to each other and to said front surface of said support adjacent to said first edge;

an adhesive strip located adjacent to said second edge on said back surface and between said second edge and said third line; and wherein said second line of structural weakness is located a distance from said first line of structural weakness equal to forty-four to forty-five percent of the distance between said first line of structural weakness and said second edge of said support.

11. A display as in claim 10 wherein said third line of structural weakness is located a distance from said first line of structural weakness equal to eighty-three to eighty-four percent of the distance between said first line of structural weakness and said second edge of said support.

12. A display comprising:

a support defining first and second opposed edges and third and fourth opposed edges, and further defining opposed front and back surfaces;

said support defining a first line of structural weakness for aiding bending or severance located substantially midway between said first and second opposed edges;

said support defining a second line of structural weakness for aiding bending located between said first line and said second edge;

said support defining a third line of structural weakness for aiding bending located between said second line and said second edge;

a plurality of stacked sheets bearing indicia and defining upper margins removably connected at said margins to each other and to said front surface of said support adjacent to said first edge;

an adhesive strip located adjacent to said second edge on said back surface and between said second edge and said third line; and further including a first card removably attached to said second edge of said support, said card containing printed matter thereon.

13. A display as in claim 12 wherein said second edge defines a fifth line of structural weakness for aiding bending or severance.

14. A display as in claim 13 wherein said card defines a sixth line of structural weakness for aiding bending.

15. A display as in claim 14 wherein said card is substantially rectangular and wherein said sixth line of structural weakness is substantially parallel with said fifth line of structural weakness.

16. A display as in claim 13 further including a second card removably attached to said front surface of said support between said first line of structural weakness and said fifth line of structural weakness.

17. A display as in claim 16 wherein said second card is removably glued to said front surface.

18. A display as in claim 13 further including a material of predetermined characteristics attached to said front surface of said support for enabling removable marking on said material with ink.

19. A display as in claim 18 further including a first fastening element attached to said front surface adjacent to said fifth line of structural weakness, and a pen containing ink in combination with said display, and a second fastening element attached to said pen for removably connecting said pen to said first fastening element.

20. A display as in claim 13 wherein said first card further defines an additional line of structural weakness for aiding bending or severance extending substantially perpendicularly with respect to said fifth line of structural weakness.

21. A display as in claim 20 further including a second card removably attached to said front surface of said support between said first line of structural weakness and said fifth line of structural weakness, said second card containing printed matter thereon.

22. A display as in claim 21 wherein said second card is removably glued to said front surface.

23. A display as in claim 20 further including a first fastening element attached to said front surface adjacent to said fifth line of structural weakness, and a pen containing ink in combination with said display, and a second fastening element attached to said pen for removably connecting said pen to said first fastening element.

* * * * *